Figure 1:
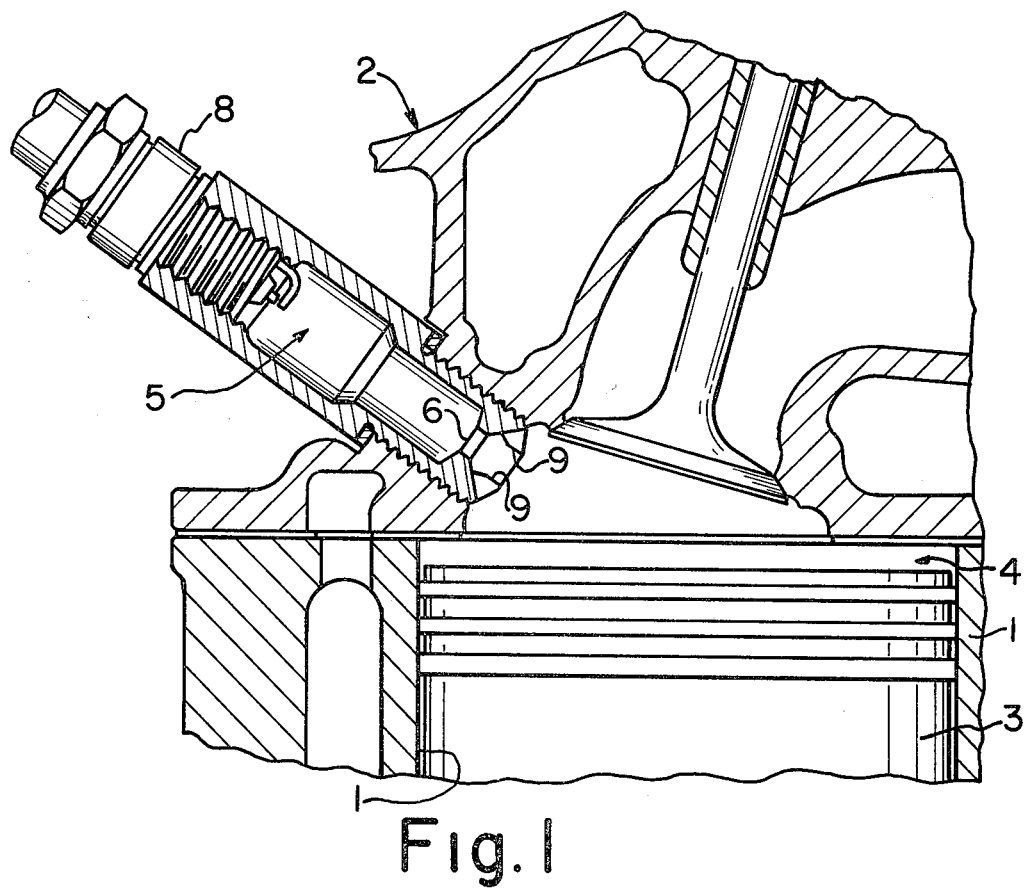

United States Patent

Karlovitz

[11] 4,176,649
[45] Dec. 4, 1979

[54] EMISSION CONTROL

[75] Inventor: Bela Karlovitz, Pittsburgh, Pa.

[73] Assignee: Toyota Motor Company, Ltd., Toyota, Japan

[21] Appl. No.: 945,390

[22] Filed: Sep. 25, 1978

Related U.S. Application Data

[63] Continuation of Ser. No. 684,476, May 10, 1976, abandoned.

[51] Int. Cl.² .................. F02B 19/08; F02B 19/18
[52] U.S. Cl. ........................ 123/191 SP; 123/30 D; 123/32 C; 123/32 K; 123/32 SP; 123/191 S; 123/169 PA
[58] Field of Search .............. 123/30 C, 30 D, 32 C, 123/32 D, 32 K, 32 SP, 191 S, 191 SP, 75 E, 169 R, 169 PA

[56] References Cited

U.S. PATENT DOCUMENTS

| | | | |
|---|---|---|---|
| 1,511,739 | 10/1924 | McDowell | 123/169 PA |
| 1,523,454 | 1/1925 | Shepherd | 123/169 R |
| 2,127,512 | 8/1938 | Harper, Jr. | 123/169 PA |
| 3,710,772 | 1/1973 | Warner | 123/169 R |

Primary Examiner—Charles J. Myhre
Assistant Examiner—Jeffrey L. Yates
Attorney, Agent, or Firm—Finnegan, Henderson, Farabow & Garrett

[57] ABSTRACT

An internal combustion engine and a method of operating same, comprising a combustion chamber having main and auxiliary sections. The air-fuel mixture compressed in the combustion chamber causes turbulence and swirling of the mixture in the auxiliary section. On ignition, the initial combustion rate in the auxiliary section is limited by the centrifugal force on the flame. The jet of gases rushing out of the auxiliary section is not swirled and controls the rate of burning in the main section to reduce peak flame temperature and hence, to reduce CO, $NO_x$ and HC emissions.

14 Claims, 3 Drawing Figures

U.S. Patent  Dec. 4, 1979  4,176,649

EMISSION CONTROL

This is a continuation of application Ser. No. 684,476, now abandoned filed May 10, 1976.

This invention is directed to an internal combustion engine and method of operating the engine. The invention is of great importance because it enables minimization of harmful exhaust emissions including CO, $NO_x$ and unburned hydrocarbons (HC).

In my U.S. Pat. No. 3,776,212, issued on Dec. 4, 1973, a method and apparatus were described for the control of harmful emissions in which very lean air fuel mixtures were burned. The engine differed from prior art internal combustion engines in the construction of the combustion chamber. The combustion chamber comprised a main section and an auxiliary section. The auxiliary section was in communication only with the main section by an orifice sized to pass a flame and promote turbulence. Valves provided for introducing an air-fuel mixture only to the main section. A spark plug was located either in the main section or the auxiliary section. Rapid burning of the lean air-fuel mixtures was accomplished by turbulence generated by a jet issuing from an auxiliary combustion section into the main combustion section.

The method of operating the engine as described in my above-identified patent was (a) to introduce only a very lean combustible mixture (air-fuel ratio of at least 18:1) only to the main combustion chamber, (b) to compress the combustible mixture in the main section thereby forcing part of the mixture through the orifice into the auxiliary section to create turbulence therein (c) to ignite the combustible mixture within the combustion chamber from a single ignition source (d) to cause a rapid rise in pressure in the auxiliary section due to the rapid burning caused by the turbulence and (e) to cause the combustion products of the auxiliary section to escape through the orifice into the main section to create sufficient turbulence to cause substantially entire burning within an acceptable crank angle.

Further reduction of CO, $NO_x$ and HC emissions may be achieved by improvements upon the above-described combustion process. The method and apparatus to accomplish these improvements are described herein.

The rate of $NO_x$ generation in lean air-fuel mixture is a steep function of the flame temperature. For example, at 15 atmospheres pressure and 425° C. mixture temperature before combustion, the calculated peak flame temperature and the $NO_x$ generating rate are shown in the following table:

| Air-Fuel Ratio | Flame Temperature | Rate of $NO_x$ Formation |
| --- | --- | --- |
| 15 | 2260° C. | 750–500 ppm/msec. |
| 20 | 1965° C. | 70–65 ppm/msec. |
| 21.4 | 1800° C. | 9.5–7.0 ppm/msec. |

This table illustrates that the flame temperatures in the engine must be kept below about 1900° to 2000° C. to keep the rate of $NO_x$ emissions formation low. On the other hand, measurements show that the unburned hydrocarbon (HC) emissions are strongly affected by the temperature of the exhaust gas. The HC emissions can be maintained low even in large engines, if the exhaust gas temperature is not too low, for example, in excess of about 750° C. The residual hydrocarbons are burned at the end of the burning process but only if temperatures have not fallen so fast to slow down their burning.

I have now discovered that the apparatus and methods of my prior patent together with certain essential modifications can be used to burn a very lean air-fuel mixture within an acceptable crank angle and such that the peak flame temperature does not exceed about 1900° to 2000° C.

Briefly, according to this invention, the compression ratio of the air-fuel mixture is adjusted and the burning rate is controlled to provide a combined constant volume-constant pressure burning cycle. In this cycle, a portion of the fuel is burned at near constant volume at about top dead center and the remainder is burned near constant pressure just after top dead center, say within 30 degrees. By burning only a portion of the fuel near top dead center, the peak flame temperatures can be kept below a critical temperature for $NO_x$ formation. At the same time, this combined cycle can provide good efficiency.

The burning cycle consisting of combustion at approximately constant volume followed by combustion at approximately constant pressure is realized by controlling the combustion rate in the main combustion section by introducing the proper amount of turbulence during the combustion period. As in my prior patent, turbulence is generated in the main combustion section by a jet issuing through an orifice from the auxiliary combustion section. The strength of the jet is controlled by the burning rate in the auxiliary section. The burning rate of turbulent flames is strongly affected by centrifugal force. By introducing a swirling motion into the air-fuel mixture entering the auxiliary section during the compression stroke, the burning rate in the auxiliary chamber is slowed down, the strength of the jet initially issuing from the orifice into the main section is reduced and the development of a pressure and temperature peak in the main section is avoided. The duration of combustion in the auxiliary section is extended and thereby the proper amount of turbulence is provided for the completion of combustion in the main section. The intensity of the swirling motion constitutes an additional independent parameter for the control of the combustion process and for the realization of the desired pressure cycle of the engine.

The centrifugal force due to the swirling motion keeps the burning gases and hot combustion products in the axial region of the auxiliary combustion section. Consequently, the heat losses to the sidewalls of this section are minimized.

Further, the centrifugal force while confining the burning to the axial region of the auxiliary section permits the flame to move along the axis. Hence, a burning jet can issue from the auxiliary section shortly after ignition even in the case where the spark is located at the far end of the auxiliary section. The structure causing the swirling motion in the air-fuel mixture entering the auxiliary chamber does not obstruct nor affect the jet issuing from the orifice. The jet, therefore, is injected into the main combustion chamber substantially without swirling.

Figure 2:
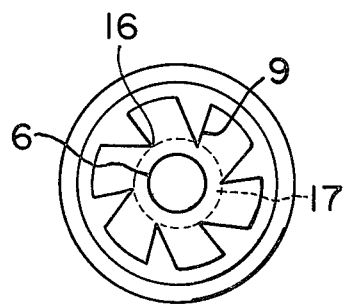
Figure 3:
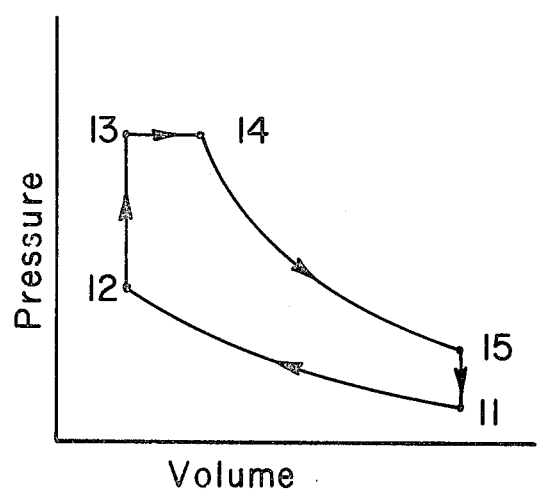

Further features and other objects and advantages of this invention will become apparent from the following detailed description made with reference to the drawings in which:

FIG. 1 is a section through a cylinder of an engine according to this invention, FIG. 2 is a plan view looking toward the orifice of an auxiliary section in an engine according to this invention illustrating vanes for causing swirl, and FIG. 3 is a pressure volume diagram useful in the explanation of the operation of internal combustion engines according to this invention.

Referring now to FIG. 1, a combustion chamber is shown defined by cylinder walls 1, cylinder head 2 and a piston 3. The section is such that an intake or exhaust valve is shown. The main section 4 of the combustion chamber is connected with an auxiliary section or combustion pod 5 and orifice 6. An ignition electrode (spark plug) 8 is shown positioned within the combustion pod opposite the orifice.

Vanes 9 are shown adjoining the orifice 6. The vanes 9 terminate in points 16 determining substantially a circular outline 17 of greater diameter than that of the orifice 6.

As explained in my above-identified patent, in a typical engine with a compression ratio of 10:1, operated at a very lean air-fuel ratio of about 20:1, turbulence can be provided which enables the burning of the mixture without any power loss within an acceptable crank angle without danger of flame quenching. The problem was to supply the needed turbulence at the right time. Because of the rapid rate in which kinetic energy of turbulent motion is absorbed and because of the amount of turbulence required for rapid combustion of lean air-fuel mixtures, turbulence cannot be introduced much ahead of time. Turbulence must be generated when needed.

According to this invention, turbulence is provided by a small auxiliary section of the combustion chamber in communication with the main combustion section through an orifice. The kinetic energy of the air-fuel mixture forced through the orifice in the auxiliary chamber during the compression stroke is rapidly converted into turbulence. An intense swirl of the mixture is also caused, for example, by the vanes near or in the orifice. Although intense swirl can be caused by vanes in the orifice, it is preferred that the vanes lie outside the orifice so as not to cause swirl in the issuing jet.

On ignition, the highly turbulent mixture burns at a rate controlled by turbulence and the swirl. Shortly after ignition, the pressure in the auxiliary section exceeds the pressure in the main section and a high velocity jet is ejected into the combustion chamber. In the illustrated embodiment, the vanes 9 do not penetrate into the area of the orifice 6 to cause swirling motion in the issuing jet. The jet generates the turbulence necessary for rapid completion of combustion within the main section of the combustion chamber.

The action within the auxiliary section will now be described. Consider an auxiliary section with a swirling motion of the air-fuel mixture around an axis. Centrifugal force will influence the propagation of the turbulent flame very strongly. The flame propagation rate is increased when the flame is moving against centrifugal force as small bubbles of burned gas move in the denser unburned gas against the direction of the centrifugal force. The flame propagation rate is reduced when the flame is moving in the direction of the centrifugal force because the buoyancy force of the centrifugal field tends to smooth out the wrinkling of the combustion wave caused by the turbulent fluctuations.

After ignition, the burning and burned gases will be concentrated in the axis of the auxiliary section because centrifugal force will move the cold unburned mixture to the outer region. Consequently, a burning jet will issue from the auxiliary section very shortly after ignition. The burning rate in the auxiliary section may be adjusted by the velocity of the swirl motion. In turn, it is possible to control the burning rate of the charge in the main section so that pressure and temperature peaks are avoided and combustion is completed at an acceptable crank angle, say by 30 degrees after top dead center.

As the velocity of the flow into the auxiliary section during the compression stroke and consequently turbulent intensity and centrifugal acceleration vary together with the varying engine RPM, this control of the combustion rate adjusts itself automatically to any engine speed.

FIG. 3 is a volume-pressure diagram of a cycle which illustrates the desired constant volume-constant pressure burning. Fresh air-fuel charge is compressed adiabatically between points 11 and 12. Ignition is at point 12. Part of the charge is burned between points 12 and 13 at approximately constant volume, raising the pressure at point 13 to approximately 1.5 to 2.5 times the pressure at point 12. The rest of the charge is burned at nearly constant pressure between points 13 and 14. Expansion of the charge is completed between points 14 and 15. The temperature of the flame between points 13 and 14 is also approximately constant.

Calculations indicate, for example, that in an engine with a compression ratio of 10:1, it is possible to burn a mixture with an air-fuel ratio of 20 in a manner to fulfill the above requirements with the following numerical results:

One third of the charge is burned at approximately constant volume. $P_{13}/P_{12}=2$.

Two thirds of the charge is burned at approximately constant pressure.

Flame temperature $T_{13}=T_{14}\cong1960°$ C.

$NO_x$ generation rate $\cong70$ ppm/msec.

Combustion is completed within about a 30° crank angle.

$NO_x$ concentration is frozen at 45° crank angle.

Exhaust gas temperature, $T_{15}\cong930°$ C.

Increasing the air-fuel ratio from 20 to 21 could reduce the $NO_x$ generation by a factor of 3.

The following abbreviated calculations show the intensity of swirl in the auxiliary section required for controlling the combustion rate in the auxiliary section. The centrifugal acceleration, C, at a point within the auxiliary section is related to the circumferential velocity $U_V$ and the radius, r, of the swirling mass as follows:

$$C=U_V/r \qquad (1)$$

The magnitude of the centrifugal acceleration C which can counteract the effect of turbulence on flame propogation may be developed as follows: Where the scale of turbulence is 1cm, and the intensity of turbulence is u' cm/sec, then the characteristic time of turbulence $t_2$ may be represented as follows:

$$t_2=l/u' \text{ seconds} \qquad (2)$$

The characteristic time in the centrifugal force field $t_3$ is the time required for the centrifugal acceleration C to reduce the root mean square turbulent velocity, u', to zero, that is;

$$t_3=u'/C \qquad (3)$$

At the critical condition, when the characteristic times $t_2$ and $t_3$ are equal, the effect of turbulence on the flame propogation rate is compensated by the centrifugal force. At this condition:

$$t_2 = t_3$$

$$l/u' = u'/C$$

$$C = u'^2/l \qquad (4)$$

The centrifugal acceleration required to reduce the flame propogation rate in the pre-combustion chamber to the desired rate will be a fraction of the above-critical value. The above equations can be combined to state the critical condition as follows:

If $U_V$ is the circumferential velocity and r the radius of swirling motion, then $$\left(\frac{U_V}{u'}\right)^2 = \frac{r}{l} \qquad (5)$$

Consider the following numerical example. If r/l is 10 (a typical value) then for the critical condition $$\left(\frac{U_V}{u'}\right)^2 = 10$$

and $$\frac{U_V}{u'} = 3, \text{ therefore,}$$

Assuming, u' = 1400 cm/sec. (a typical value)
$U_V$ = 4200 cm/sec.

The ratio of the circumferential velocity $U_V$ to the axial flow U through the orifice, is a parameter ($t_g \alpha$) indicative of the deflection the vanes must provide to create the desired swirl. At an axial flow velocity of U = 32,000 cm/sec. and $U_V$ = 4200 cm/sec. then, $$t_g \alpha = \frac{U_V}{U} = \frac{4200}{32,000} = 0.13.$$

A vane angle of approximately 20°-30° (as shown in FIG. 3) should provide the correct amount of swirl in an engine with cylinders having approximately 60 cc total compression volume, an auxiliary chamber comprising about 6 cc volume and with a 5 mm diameter orifice between the main and auxiliary chambers.

The auxiliary combustion section with an orifice designed to provide a swirl enables the operation of an internal combustion engine to minimize harmful enissions as follows: With the compression ratio selected to reasonably good efficiency, say 10:1, and using a lean air-fuel mixture, say 18:1 or leaner, the timing of the spark may be chosen (near top dead center) and the turbulence generated such that the desired constant pressure plus constant volume burning curve is achieved. The ratio of the pressure at the start of the constant volume burning and the pressure at the end of the constant volume burning may be about 1:2. Such a burning curve will keep the peak flame temperature and the exhaust gas temperatures in the ranges to minimize $NO_x$ formation and to remove hydrocarbon residuals, respectively.

The selection of the auxiliary section size and the orifice size is basically as taught in my prior patent except that an additional independent parameter, namely swirl, must be considered.

Having thus described my invention with the detail and the particularity as required by the patent laws, what is desired protected by Letters Patent is set forth in the following claims.

I claim:

1. A method of operating an internal combustion spark ignition engine having at least one cylinder and a reciprocating piston therein defining a combustion chamber, said combustion chamber being divided into main and auxiliary sections, there being an orifice disposed between the main and auxiliary sections and arranged on a central axis of the auxiliary section, the cross-sectional area of the orifice being smaller than the cross-sectional area of the auxiliary section, comprising the steps of:

introducing a combustible mixture to the combustion chamber;

compressing the combustible mixture in the combustion chamber and thereby forcing part of the mixture in the main section through the orifice into the auxiliary section;

creating turbulence and swirl of the combustible mixture about the axis of and within the auxiliary section for forcing the lighter components of the combustible mixture into the area along the axis by centrifugal force;

igniting the combustible mixture located along the axis of the auxiliary section within the auxiliary section of the combustion chamber from an ignition source, said swirl causing heavier uncombusted components of the combustible mixture to be forced to the peripheral areas of the auxiliary section;

causing a controlled rise in the pressure in the auxiliary section to rapidly inject into the main section a burning jet of the combustible mixture located along the central axis of the auxiliary section;

causing a gradual propagation of the flame of the ignited mixture toward the periphery of the swirled combustible mixture in the auxiliary section to burn the heavier uncombusted portions of the combustible mixture and to continue to inject a long-burning jet into the main section; and causing the burning jet to escape through the orifice substantially without swirling motion into the main section creating sufficient turbulence therein to cause part of the mixture to burn at substantially constant volume followed by a substantially constant pressure burning of the rest of the mixture whereby the peak temperature of the cycle is limited and the $NO_x$ emissions are reduced.

2. The method according to claim 1 in which the compression ratio is typically 10:1 and the ratio of the pressure at the start of the constant volume burning to the pressure at the end of the constant volume burning is typically 1:2.

3. The method according to claim 1 in which ignition is started at the end of the auxiliary section opposite the orifice.

4. The method according to claim 1 in which the part of the mixture forced through the orifice is forced past vanes positioned near the orifice to provide the swirl.

5. In an internal combustion engine having at least one cylinder and a reciprocating piston therein defining a combustion chamber, means for dividing the combustion chamber into a main section and an auxiliary cylindrical section, said dividing means defining an orifice disposed between the main section and the auxiliary section and arranged on the central axis of the auxiliary section, the cross-sectional area of the orifice being smaller than the cross-sectional area of the auxiliary section, means for introducing a combustible mixture into the combustion chamber, the ratio of the volume of the main and auxiliary sections and the size of the orifice being selected such that, during the compression cycle, part of the combustible mixture of fuel and air rushes into the auxiliary section causing turbulence, the improvement comprising:
  means to cause the combustible mixture in the auxiliary section to swirl about the axis in the auxiliary section and to force heavier uncombusted components of the combustible mixture to the peripheral areas of the auxiliary section; and
  means for igniting a long-lasting and steady jet comprising a spark plug in the combustion chamber located on the axis of the auxiliary section, wherein after ignition a burning jet of the combustible mixture located on the central axis of the auxiliary section is injected into the main section via the orifice and the flame of the burning gas gradually propagates towards the periphery through the heavier uncombusted components of the swirled combustible mixture in the auxiliary section, said means to cause swirl of the combustible mixture in the auxiliary section causing substantially no swirl in the burning jet.

6. The improvement according to claim 5 wherein the spark plug is at the end of the auxiliary section opposite the orifice.

7. The improvement according to claim 5 wherein vanes are positioned near the orifice to provide the swirl to the mixture forced into the auxiliary section, said vanes lying outside said area of the orifice.

8. The improvement according to claim 7 in which the size of the orifice, the size of the auxiliary section and the amount of swirl provided by the vanes, are selected to introduce turbulence to the main section to cause substantially constant volume burning followed by substantially constant pressure burning.

9. The method according to claim 1 wherein the combustible mixture is introduced to the main section of the combustion chamber.

10. The method according to claim 1 wherein the combustible mixture is a lean air-fuel mixture having an air-fuel ratio of at least 18.

11. The method according to claim 1 wherein the compressing step further comprises causing a swirl of the part of the combustible mixture while the part flows through the orifice.

12. The method according to claim 1 wherein the step of causing a controlled rise in pressure in the auxiliary section controlled by the swirl includes the step of separating the lighter from the heavier gases by the centrifugal force of the swirl.

13. The improvement according to claim 5 wherein said auxiliary section is in communication with only the main section and wherein all of the combustible mixture is introduced to the main section.

14. The improvement according to claim 5 wherein the means to cause the gases in the auxiliary section to swirl about the axis in the auxiliary section generates swirl with sufficient centrifugal force to separate lighter from heavier gases in the auxiliary section.

* * * * *